June 16, 1942.　　　W. A. BRUNO　　　2,286,338
RETRACTABLE LANDING LIGHT ARRANGEMENT FOR AIRCRAFT
Filed Aug. 1, 1941　　　2 Sheets-Sheet 1

INVENTOR.
William A. Bruno
BY Mock & Blum
ATTORNEYS

June 16, 1942.   W. A. BRUNO   2,286,338
RETRACTABLE LANDING LIGHT ARRANGEMENT FOR AIRCRAFT
Filed Aug. 1, 1941   2 Sheets-Sheet 2

INVENTOR.
William A. Bruno
BY  Mock & Blum
ATTORNEYS

Patented June 16, 1942

2,286,338

UNITED STATES PATENT OFFICE 2,286,338

RETRACTABLE LANDING LIGHT ARRANGEMENT FOR AIRCRAFT

William A. Bruno, Astoria, Long Island, N. Y., assignor, by mesne assignments, to Bruno Patents Inc., Long Island City, N. Y., a corporation of New York Application August 1, 1941, Serial No. 405,041

3 Claims. (Cl. 240—7.7)

This invention relates to a retractable landing light arrangement for aircraft, in which the landing light can be retracted from its operative positions into the structure of the aircraft.

It is one object of my invention to provide a landing light arrangement which is adapted to be mounted to the structure of an aircraft, and can be easily and safely moved from the inoperative position into its operative positions and vice versa.

It is another object of this invention to provide electro-mechanical means which enable the operator to cause movements of the landing light device in alternate directions, and to arrest said movements in the desired position of the landing lamp.

It is also an object of this invention to provide means for automatically arresting the movement of the landing light device when it reaches certain end positions.

Other objects and advantages of the invention will appear from the following specification, and the drawings which show, by way of example, a preferred embodiment of my invention, and in which Fig. 1 is a top view of the landing light arrangement according to my present invention;

Figure 1:
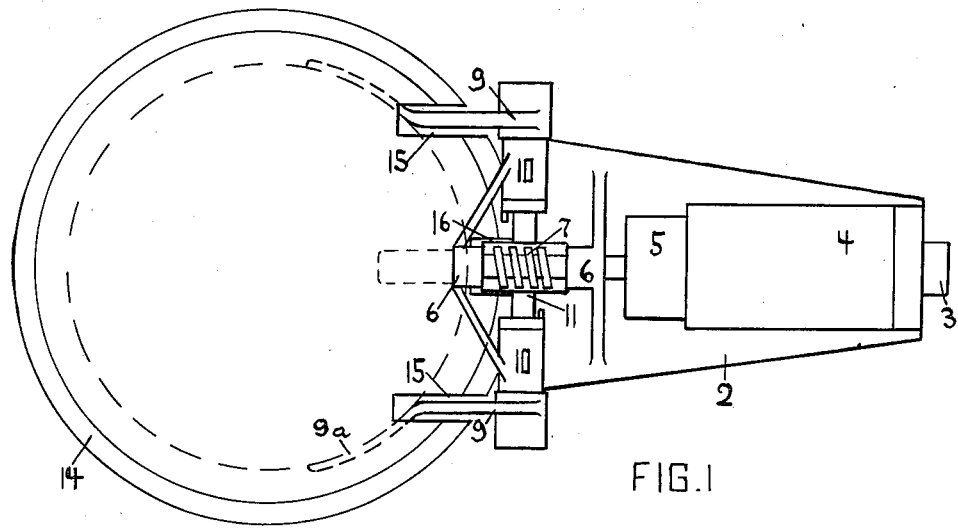
Figure 2:
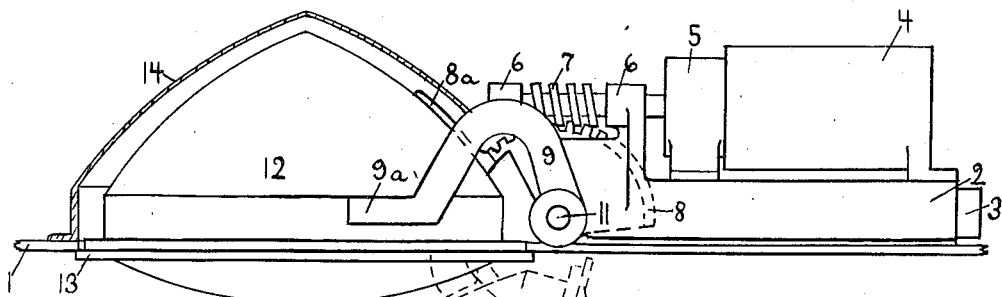
Fig. 2 is an elevation of said arrangement, showing the lamp in its retracted and its lowered position.
Figure 3:
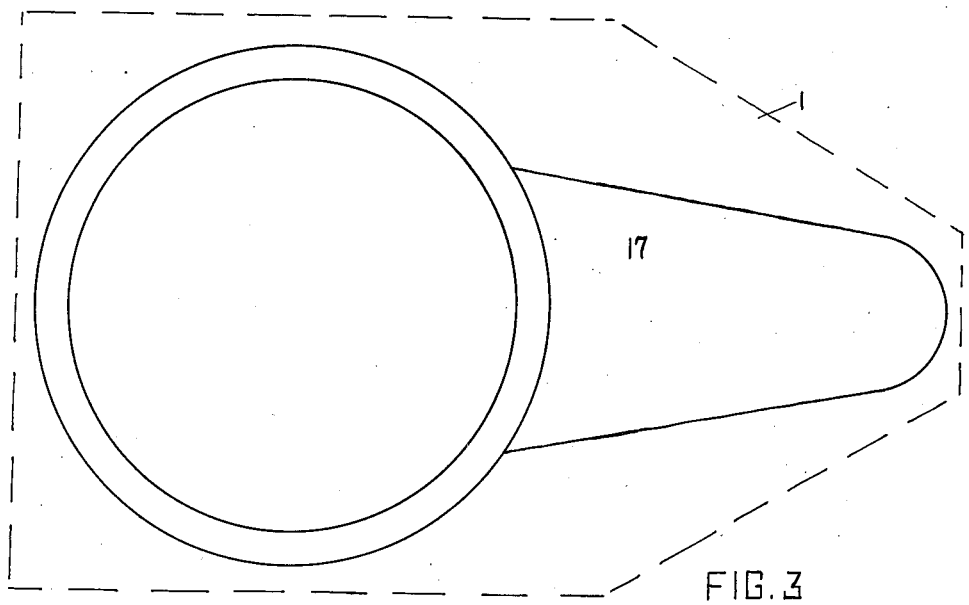
Fig. 3 is a bottom view.

Referring now to Fig. 2, the light assembly designated by the assembly numeral 12 is shown in its retracted position, the position of the assembly when lowered through an opening in the skin of the aircraft, being shown in dotted lines. 2 indicates a machine frame, 4 a split series wound electromotor of well-known design, which can be caused to rotate in alternate directions, and 3 a connecting plug for said electromotor. This electromotor 4 which is provided with a speed reduction box 5, causes slow rotation of worm 7 in bearings 6, said worm 7 being in engagement with worm gear 8. Shaft 11 of said worm gear 8 rotates in bearings 10 which are connected with frame 2. Two levers 9 are rigidly connected with shaft 11 of worm gear 8, and these levers are provided with extensions 9a, which are secured to the lamp 12. Extension 8a is also secured to lamp 12, and thus connects worm gear 8 with lamp 12. The lamp 12 has a rim 13 and carries a glass or lens as indicated. In its retracted position the lamp 12 is housed by a fixed shell 14, which is provided with recesses 15 for the passage of levers 9, and with a recess 16 for the passage of worm gear 8. The lower side of skin 1 may be provided with a reinforcing plate 17, as indicated in Fig. 3.

If the lamp assembly is in its retracted position, and the electromotor 4 is actuated by the operator in the proper direction, worm gear 8 and shaft 11 are caused to rotate, and simultaneously the lamp 12 is pulled out in the direction of its outer position by the action of levers 9, and extension 8a. The movement of the lamp may be arrested by breaking the circuit energizing the motor 4 at any time. The lamp may be retracted into its rest position in a similar manner by causing the electromotor to rotate in the opposite direction. In such a manner a movement up to about 90° may be obtained.

Figure 4:
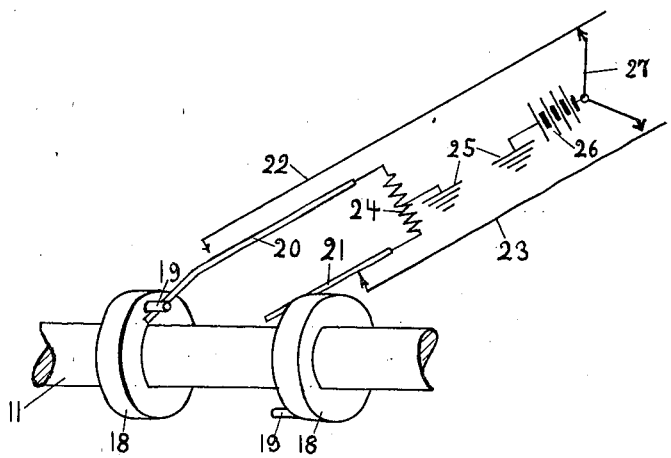
Fig. 4 shows a schematic wiring diagram of my new and improved arrangement.

As indicated in the schematic wiring diagram of Fig. 4, the movement of the motor is automatically arrested when the lamp reaches its end positions, i. e. its final outer position or its rest position. In said Fig. 4 the electro-motor is indicated at 24, the grounds at 25, the battery at 26, and the switch to be actuated by the operator at 27. Discs 18 are connected with shaft 11, and provided with control pins 19, which move the flexible contacts 20 and 21, respectively, and thus break the connection with conductors 22 and 23, respectively, when the lamp reaches the above mentioned end positions.

The lamp of the light assembly 12 may be supplied with electric current, for example, by means of an auxiliary circuit in such a manner that said lamp will be energized automatically as soon as it leaves its housed position, while energizing of the lamp is automatically discontinued when the lamp is retracted into said housed position.

The arrangement shown permits a very safe, smooth and uniform movement of the landing lamp, and movements of the lamp up to 90° relative to its rest position. Such safe, smooth and uniform movement of the lamp is secured by the above described connection of the worm gear 8 with lamp assembly 12, and by the use of levers 9 and their extension 9a, which hold and guide the lamp safely, and protect it from the action of air pressure and other atmospheric influences.

Various changes may be made in the principles of my invention without departing from the spirit thereof, as set forth in the specification, drawings and claims.

I claim:

1. In a retractable light arrangement for aircraft, a light projecting device mounted to the outer structure of said aircraft; an opening in said structure, and means adapted to lower and raise the light projecting device through said opening; said means holding said lighting device at three spaced points, and comprising a rotatable shaft, a worm gear fastened to said shaft, said worm gear having an extension thereon, said extension being directly fastened to said light projecting device, connecting elements arranged symmetrically and spaced apart a substantial distance on both sides of said worm gear, said elements being rigidly fastened to said shaft and to said light projecting device, a worm engaging said worm gear, and means adapted to rotate said worm in alternate directions.

2. In a retractable light arrangement for aircraft, a light projecting device mounted to the outer structure of said aircraft, an opening in said structure, and means adapted to lower and raise said light projecting device through said opening; said means holding said light projecting device at three spaced points, and comprising a rotatable shaft, a worm gear which is substantially centrally arranged with respect to said opening and said light projecting device, said worm gear having an extension thereon, said extension being directly fastened to said light projecting device, two arms which are arranged substantially symmetrically and spaced apart a substantial distance on both sides of said worm gear, and rigidly fastened to said light projecting device and to said shaft, a worm engaging said worm gear, and means adapted to rotate said worm in alternate directions.

3. In a retractable light arrangement for aircraft, a light projecting device mounted to the outer structure of said aircraft, an opening in said structure, and means adapted to lower and raise said light projecting device through said opening; said means holding said light projecting device at three spaced points, and comprising a rotatable shaft, a worm gear which is substantially centrally arranged with respect to said opening and said light projecting device, and is fastened to said shaft, said worm gear having an extension thereon, said extension being directly fastened to said light projecting device, two arms which are substantially symmetrically arranged on both sides of said worm gear, and rigidly fastened to said light projecting device and to said shaft, and spaced apart a distance approximating the outer diameter of said light projecting device, a worm engaging said worm gear, and means adapted to rotate said worm in alternate directions.

WILLIAM A. BRUNO.